Jan. 20, 1931.    M. E. LEEDS    1,789,683
SPEED CONTROL APPARATUS
Filed July 18, 1928    2 Sheets-Sheet 1

Inventor
Morris E. Leeds
By Cornelius D. Ehret
Attorney

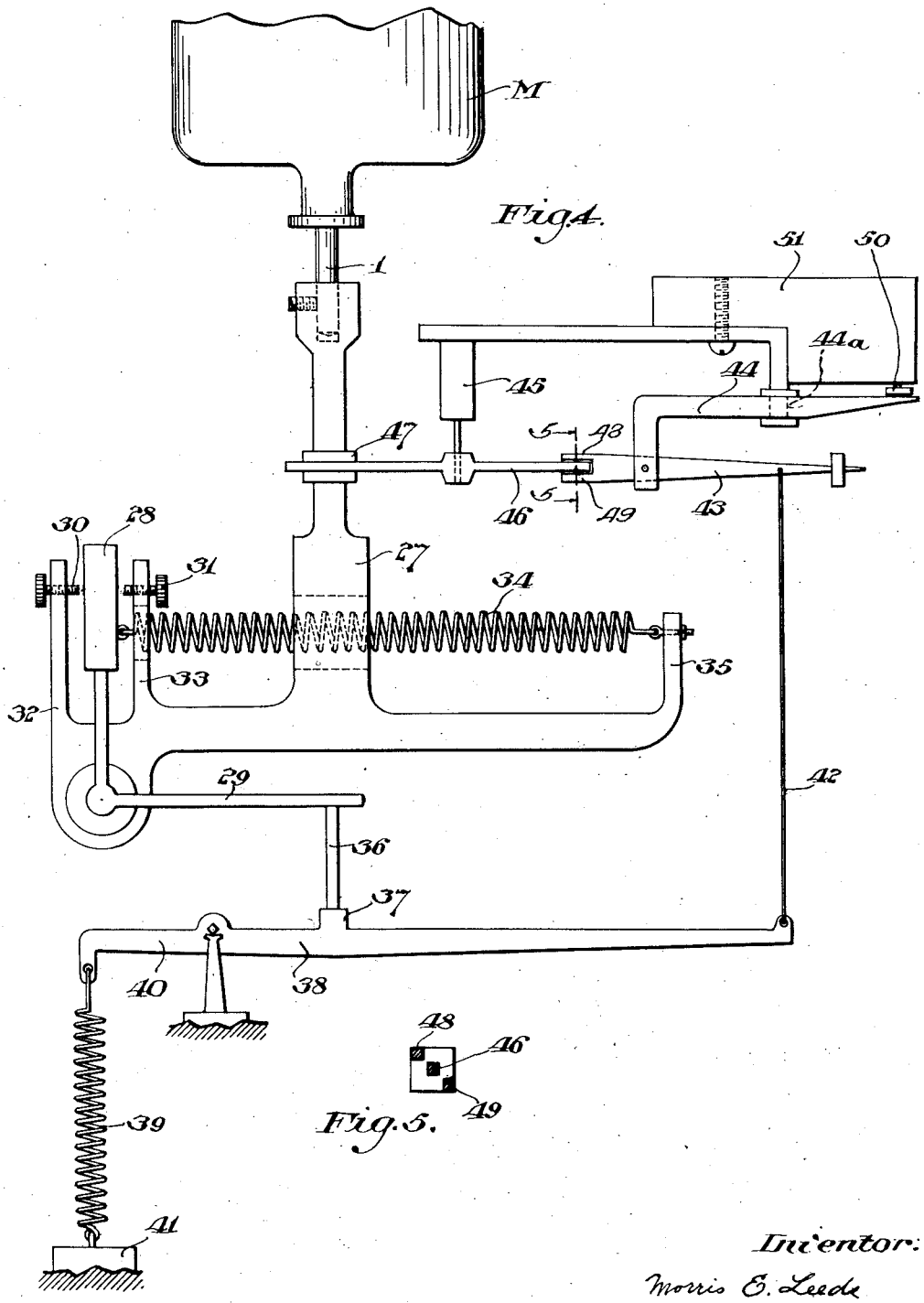

Patented Jan. 20, 1931

1,789,683

UNITED STATES PATENT OFFICE

MORRIS E. LEEDS, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

SPEED-CONTROL APPARATUS

Application filed July 18, 1928. Serial No. 293,740.

My invention relates to speed control apparatus for maintaining constant the speed of mechanism driven by a motor, and more particularly to a governor for maintaining constant the angular velocity of the rotor of an electric motor used for timing purposes, such as for driving clocks, or for any purpose where constant speed is desired, under varying conditions of load on the driving mechanism, of impressed voltage on the driving motor, or both.

Heretofore the differential of centrifugal force acting upon a governor flyball or equivalent and a restraining force exerted thereon, as by a spring, has been utilized to control the speed of an electric motor by actuation of contact mechanism controlling the magnitude of energy supplied thereto. The action of speed governing arrangements utilizing this varying, differential force is adversely influenced by the resulting momentary and variable resistance between contacts. Additionally the small and variable differential force was more or less dissipated in overcoming the friction between relatively moving parts of the switching mechanism. Further as the speed of relative movement of the contacts was limited or determined by the low angular velocity of the flyball about its axis, arcing resulted introducing further uncontrollable effects to the detriment of precise governing.

In accordance with my invention, the position of the flyball structure merely determines the position of a switch actuating member, preferably mounted thereon, with respect to the movable structure of a switching mechanism and the force effecting actuation of the switch by said member is exerted by the motor whose speed is being controlled. As a result, since the contact resistance is constant, the velocity of contact separation is independent of and to a desired extent greater than the speed of the flyball about its axis, and the position of the flyball unaffected by friction of the switching mechanism, the speed of the motor is determined with great precision. The positive separation of the contacts by a force of relatively great magnitude prevents sticking or welding with consequent elimination of irregularities in the governing action or failure of the apparatus to function.

Further and more specifically in accordance with my invention a switch member, preferably a contact member, is mounted upon a fixed support and provided with abutments disposed in different planes which abutments are adapted to be engaged alternately by a cam member rotating with and positioned by the movable centrifugal structure, or flyball, of the governor mechanism and by force exerted by the motor, moved to effect circuit-controlling action of the contact member.

My invention further resides in features of construction and arrangement of parts hereinafter described and claimed.

For an understanding of my invention and some of the various forms which it may take, reference is to be had to the accompanying drawings in which:

Fig. 4 is a front elevational view of a modified form of governor mechanism.

Fig. 5 is a detail, sectional view, the section being taken on the line 5—5 in Fig. 4.

Figure 1:
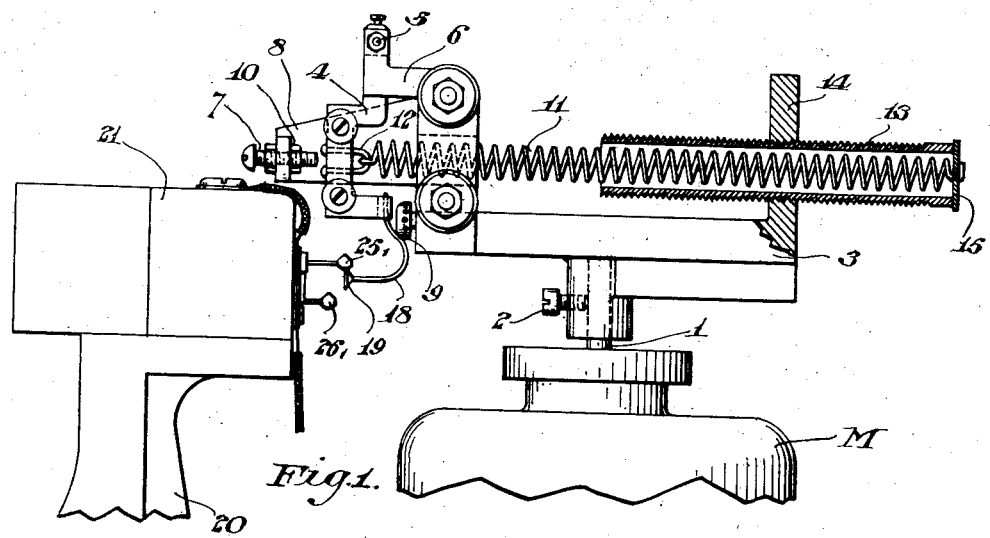
Fig. 1 is an elevational view, partly in section, of governor and switching mechanism constructed in accordance with my invention.
Figure 2:
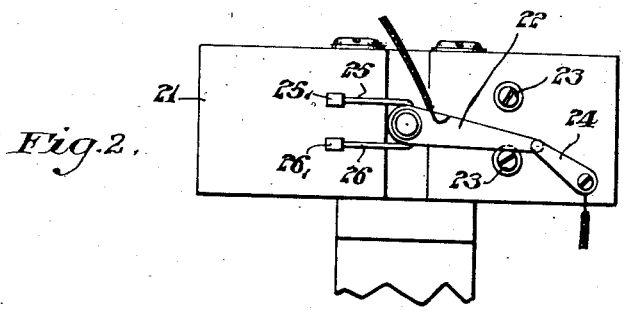
Fig. 2 is a side elevational view of the switching mechanism, looking toward the left in Fig. 1.
Figure 3:
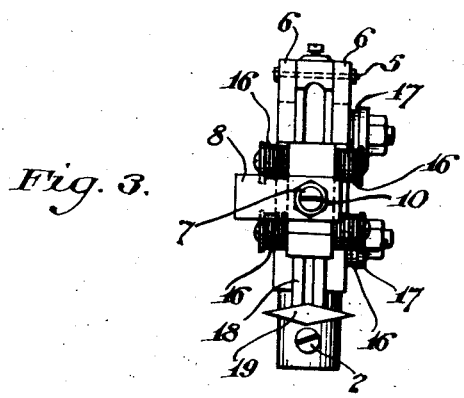
Fig. 3 is a side elevational view of governor and switch actuating mechanism, looking toward the right in Fig. 1.

Referring to Figs. 1 to 3, to the shaft 1 of a motor M is secured as by set screw 2, the rotatable frame 3 of a governor mechanism. A centrifugal member or flyball 4 is supported by and attached to shaft 5 rotatable in bearings in the upper bifurcated end of an arm 6 of frame 3. Outward, or clockwise rotation, as shown in Fig. 1, of the flyball 4 is limited by an adjustable stop 7 carried by a member 8 extending from and preferably integral with the arm 6 of frame 3 and rotation in the opposite direction is limited by screw 9 threaded into the lower portion of arm 6. Screw 7 is locked in its adjusted position, as by nuts 10, and screw 9, preferably having a capstan head to facilitate adjustment, is locked in a desired position by a set screw.

One end of a spring 11 is looped over or otherwise fastened to a U-shaped member 12 attached to the centrifugal member 4 and the other end of the spring which passes through a tube 13 threadably engaging an arm 14 of the frame 3 is secured to a plate 15 bearing against the outer end of the tube. As plate 15 is not attached thereto, adjustment of the threaded tube 13 effects change in length of the spring 11 to vary the point of response of the centrifugal member without effecting any twisting of the spring. Groups of washers 16 are provided to serve as a means for making a fine adjustment in the angular velocity of the centrifugal member 4 and with washers 17 balance the rotating frame 3.

To the free end of the movable flyball structure is attached a member 18 terminating in or to which is affixed a cam member 19 having cam surfaces operative in a plane substantially normal to the axis of rotation of the frame 3. Upon movement of the flyball structure 4 to either of its extreme positions against the stops 7 or 9, the cam 19 is in position to actuate switching mechanism, as is hereinafter more fully described. Upon a suitable, fixed support 20 is mounted a block 21 of insulating material, as fibre, or equivalent, on which is pivotally mounted a movable switch contact member 22 movable between stops 23 and adapted to engage a fixed contact 24. On opposite sides of its axis of movement, the contact member 22 is provided with the actuating arms 25 and 26 each having an impact member 25' and 26' respectively, of suitable impact resistant material at its outer free end. The arms 25 and 26 extend to different extents toward the axis of rotation of shaft 1 so that the impact members 25' and 26' thereof are adapted to be alternately engaged by the cam member 19 as the flyball 4 changes its position between adjustable stops 7 and 9.

Referring to Fig. 1 the cam member 19 is shown as just passing under the outer end of arm 25, the switch member 22 being in engagement with the fixed contact 24 to complete a control circuit tending to effect increase in speed of motor M. The angular velocity of the frame 3 is increased until it rises above a predetermined value, whereupon the torque due to centrifugal force acting on the flyball 4 is greater than the force exerted by spring 11 and as a result the flyball rotates about shaft 5 until its movement is arrested by stop 7. This movement positions the cam 19 so that during rotation of the frame 3 the lower cam surface engages and moves actuating arm 26 effecting circuit opening movement of contact 22 which, as by insertion of resistance in the motor circuit, tends to effect decrease of speed. After the centrifugal force has because of decreased speed lessened to an extent that the spring 11 predominates, the flyball 4 moves against the inner stop 9 positioning the cam 19 so that during rotation of the frame 3 the upper cam surface of member 19 engages the impact resistant terminal 25' of the member 25 to restore the contact 22 to circuit closed position. The angular velocity thereupon again increases and the cycle of operation is repeated.

It will be understood that the governing resulting from the mechanism described follows a regular and constant cycle, first increasing the angular velocity minutely and precisely and then with similar precision reducing the angular velocity slightly. The periods of high angular velocity are not necessarily equal to those of low angular velocity, and in fact, are usually different depending upon the load carried by the motor and upon the line voltage.

Referring to Figs. 4 and 5, the frame 27 of a modified governor mechanism is attached to shaft 1 of the motor M by a set screw as indicated or in any other similar manner. The centrifugal member or flyball 28 is attached to a bell crank lever 29 rotatable in bearings carried by frame 27, and is freely movable between the adjustable stop screws 30 and 31 threaded through upstanding arms 32 and 33 of the frame member. A spring 34 which passes through the central portion of the frame 27 and the arm 33 is fastened at one end to the centrifugal member 28 and to the other end to an adjustable eyeleted member which passes through the upstanding arm 35 of frame 27. The horizontal arm of bell crank lever 29 is engaged substantially in the axis of rotation of frame 27 by a connecting rod 36 which engages at its lower end an abutment 37 disposed on the upper face of a pivoted lever 38 biased to rotate in a counter-clockwise direction by spring 39 connected between the end of arm 40 thereof and a fixed member 41. The other arm of the lever is connected by link 42 to a lever 43 pivoted on a rotatable switch member 44. On a fixed supporting member 45 is pivotally mounted an arm 46 which is oscillated by an eccentric 47 secured to the rotatable support 27 of the governor mechanism.

When the flyball 28 is in the position shown, during rotation of the movable structure of the governor mechanism, the end of arm 46 remote from the eccentric oscillates freely between the projecting abutments or prongs 48 and 49 of lever 43. Upon decrease in speed of the motor to an undesired extent the prong 49 is moved into the path of movement of the oscillating arm 46 by the flyball mechanism 28 acting through connecting rod 36, lever 38 and connecting link 42. The motor M acting through the eccentric 47 and oscillating arm 46 is thereupon effective to rotate the switch member 44 about its pivot 44a in a direction controlling the circuit of the motor in such sense that the speed thereof is increased. Upon increase of speed, the flyball 28 moves outwardly towards stop 30, the spring 39 maintaining the rod 36 in engagement with the bell crank lever 29. Upon engagement of the flyball 28 by stop 30, the upper prong 48 of lever 43 is in position to be engaged by oscillating arm 46 to effect reverse movement of switch member 44 to effect the decrease in speed of motor M.

The switch member 44 may be of conducting material and serve as a contact member, the co-acting stationary contact 50 mounted on block 51 of insulating material comprising therewith the switch mechanism controlling the circuit of motor M.

This type of governor may be termed a "harmonic governor" because of the character of movement of the switching movement due to the use of the eccentric cam.

In both of the modifications of my invention above described, the energy to move the control switch is exerted by the motor and is independent of the kinetic energy of the flyball structure of the governor. The flyball or equivalent structure merely determines the position of a member, as cam 19 of Fig. 1, or arm 46 of Fig. 4, and the force effecting the actuation of the switch member is supplied by the motor. The resistance between the contacts as determined by the pressure upon them is constant and independent of the flyball structure, further, the speed of movement of the contacts is independent of the relatively low angular velocity of the flyball about its axis of rotation, such as flyball 4 about shaft 5. Further, as the force available to effect separation of the contacts is relatively large, sticking or welding is consequently eliminated.

What I claim is:

1. Speed control apparatus comprising structure movable in response to variation in velocity, a motor associated therewith, switching mechanism controlling the energization of said motor, operating means therefor comprising a pair of abutments, a member movable by said structure alternately to engage said abutments, and means to effect actuation of said switching mechanism by said motor during said engagements.

2. Speed control apparatus comprising structure rotatable in response to variation in velocity, switching mechanism comprising a pair of abutments movable in a plane at a substantial angle to the plane of rotation of said structure, and a member movable by said structure alternately to engage said abutments.

3. Speed control apparatus comprising structure movable in response to variation in velocity, a fixed support, a member carried thereby oscillated by said motor, a switch member, and mechanism positioned by said structure to effect operation of said switch member by said oscillating member.

4. Speed control apparatus comprising switching mechanism, actuating means therefor comprising a motor, mechanism movable in response to variation in velocity of said motor, and structure moved by said second-named mechanism alternately to positions effecting operative relation between said motor and said switching mechanism to effect successive actuation of said switching mechanism in opposite senses.

5. Speed control apparatus comprising structure movable in response to variation in velocity, a fixed support, a member carried thereby oscillated by said motor, a switch member, and a member alternately moved to position by said structure at which opposite circuit-controlling movements of said switch member are effected by said oscillating member.

6. Speed control apparatus comprising structure movable in response to variation in velocity, stops limiting the extent of movement of said structure, a fixed support, a member carried thereby oscillated by said motor, a switch member, and means positioned by said structure when in stop-limited position to effect operating relation between said oscillating member and said switch member.

7. Speed control apparatus comprising structure movable in response to variation in velocity, a motor associated therewith, means controlling the energization of said motor, and means to effect actuation of said control means substantially to maintain said predetermined velocity comprising a member whose position is determined by said structure and a member oscillated by said motor.

8. Speed control apparatus comprising structure movable in response to variation in velocity, a motor associated therewith, switching mechanism controlling the energization of said motor, and means to effect actuation of said switching mechanism substantially to maintain a predetermined velocity comprising a member whose position is determined by said structure and a member oscillated by said motor.

9. Speed control apparatus comprising a rotatable supporting structure, a member carried thereby movable in the axis of rotation of said structure in response to variation in velocity, a switch member, a member oscillated by said motor, and means positioned by said first member to effect actuations of said switch member in opposite directions by said oscillating member.

10. Speed control apparatus comprising rotatable supporting structure, a member carried thereby movable in response to variations in velocity, a fixed support, an oscillating member carried thereby, a switch member having a pair of abutments, and a member moved by said structure to effect alternate engagements of said abutments resulting in opposite circuit-controlling movements of said switch member by said oscillating member.

11. Speed control apparatus comprising structure movable in response to variation in velocity, a member whose position is determined by said structure, a switch member, and a member oscillated by said motor in a path intercepting that of said first member to effect operation of said switch member in a sense determined by the velocity of said structure.

12. In speed control apparatus, complementary elements disposed for movement with respect to each other into a given cooperating relationship to provide for increase in speed conditions and for such movement into a different cooperative relationship to provide for decrease in speed conditions, said elements having a neutral position with respect to each other whereat the same are out of cooperative relationship, and means responsive to speed conditions and operable in accordance with variations therein from a predetermined speed condition to effect movement of one of said elements into said given or said different cooperative relationship with the other element and operable at said predetermined speed condition to position said one of said elements in the neutral position with respect to the other element.

MORRIS E. LEEDS.